May 17, 1966     J. W. SARGENT ETAL     3,252,019

FAN BLADE FOR ROTOR

Filed Nov. 12, 1963

Inventors
John W. Sargent
Joseph T. McKean
By Robert P. Benson
Attorney

3,252,019
FAN BLADE FOR ROTOR
John W. Sargent and Joseph T. McKean, New Berlin, Wis., assignors to Allis-Chalmers Manufacturing Company, Milwaukee, Wis.
Filed Nov. 12, 1963, Ser. No. 322,779
5 Claims. (Cl. 310—60)

This invention relates generally to dynamoelectric machines. More specifically, this invention relates to fan cooled salient pole dynamoelectric machines.

It is common in the electrical industry to cool the rotors of dynamoelectric machines by attaching appropriate fan blades to the end of the rotor. In the large salient pole machines, these blades are usually attached to an extension of the spider on which the salient poles are mounted. This requires that the spider be extended axially and that rather large blades be used so that they extend radially outward to near the salient poles to direct the air where it is most needed and to operate most efficiently at the greater peripheral speed. Various other attempts have been made to mount fans on the rotor but these usually involve rather complicated and cumbersome mounting devices because the fan has to be connected to a strong mechanical part of the rotor to withstand high centrifugal forces during operation.

This invention overcomes many of the problems mentioned above by mounting relatively small fan blades on the coils of the salient poles. An extra layer of banding material is wound around the coils to mount the fan blades directly on the poles. Hence, the fan blades are in the most advantageous position for circulating cooling air and to take advantage of the higher linear speed near the outer periphery of the rotor. Furthermore, this construction eliminates the need for an extension of the spider beyond that necessary for mounting the salient poles. This in turn provides a freer circulation of air in and around the salient poles.

Therefore it is the object of the invention to provide a new and improved dynamoelectric machine.

Another object of this invention is to provide a new and improved cooling system for dynaoelectric machines.

Another object of this invention is to provide a new and improved fan mounting arrangement for salient pole dynamoelectric machines.

Other objects and advantages of this invention will be apparent from the following description when read in connection with the accompanying drawings, in which.

Figure 1:
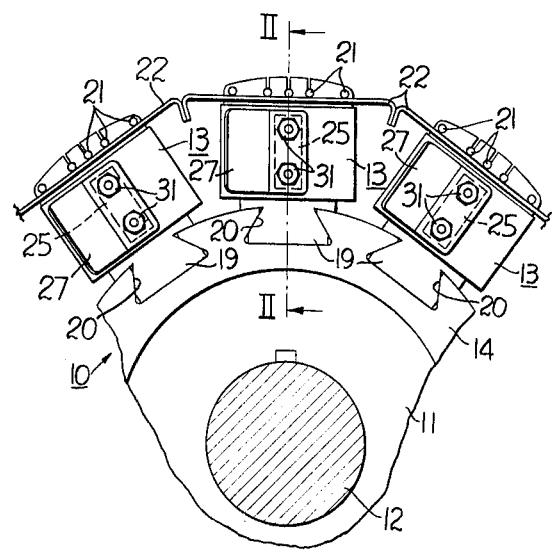
FIG. 1 is an end view of a portion of a rotor of a salient pole dynamoelectric machine incorporating the fan blades of this invention.
Figure 2:
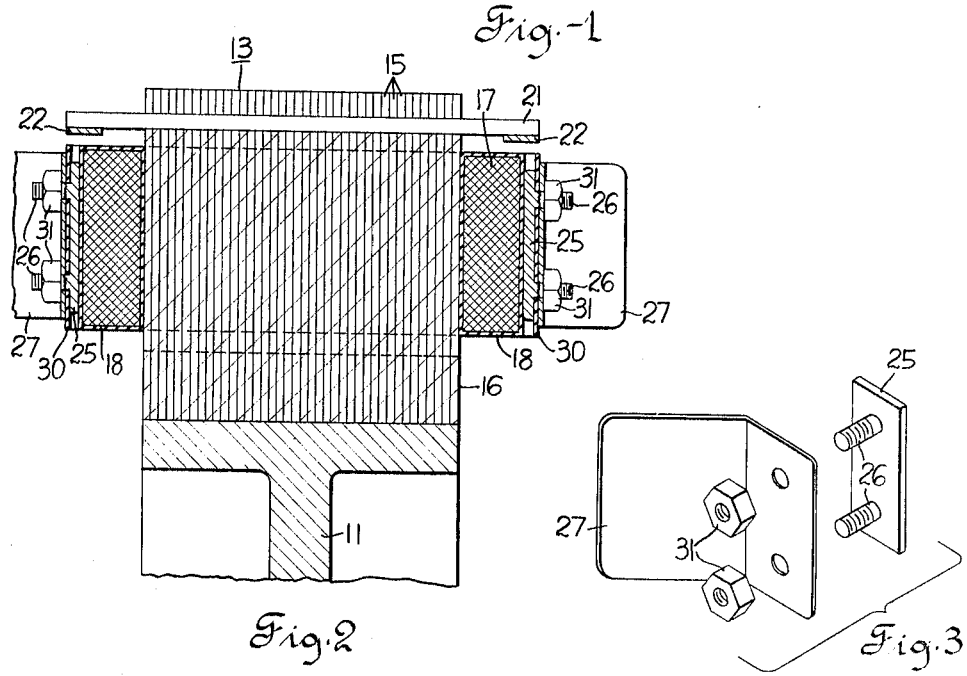
FIG. 2 is a cross sectional view taken along the lines II—II of FIG. 1.

Referring more specifically to the drawing by characters of reference, the invention is illustrated in a rotor 10 for a dynamoelectric machine. The rotor comprises an annular spider 11 mounted on a shaft 12. A plurality of arcuately spaced salient poles 13 are mounted on the outer rim 14 of the spider 11 in any suitable manner.

The salient poles 13 are made up of a stack of laminations 15 formed into a core 16 and a coil 17 wound around the core. A layer of suitable insulation 18 is formed around each coil. In the illustrated embodiment, each core 16 has a dovetail projection 19 formed thereon that fits into a complementary dovetail slot 20 in the rim 14 of the spider 11 to mount the poles on the spider.

Suitable conducting bars 21 are formed in the outer portion of the salient poles 13 and interconnected with like bars in adjacent salient poles by a suitable conducting strap 22 to form a squirrel cage starting winding for the rotor. This winding also serves as a damper winding.

After the coils have been placed on the salient pole cores 16, a layer of insulation 18 may be formed around the coil. Then a suitable base 25 is positioned on the coil. The base 25 illustrated in the drawing has a pair of studs 26 extending outward therefrom to which the fan blades 27 can be attached. After the base 25 has been positioned on the coil 17, banding tape 30 is wound around the coil to securely mount the base 25 on the pole. This tape 30 is preferably a glass banding tape impregnated with a suitable thermosetting resin so that when it is cured it has an extremely high tensile strength approaching that of steel. A tape suitable for this use is Res-I-Glas banding tape sold by the Chicago Printed String Company of Chicago, Illinois.

After the banding tape 30 has been wound over the base 25 onto the salient pole and has been cured, the fan blade 27 is positioned on the studs 26 and connected thereto by the use of suitable clamping means such as the illustrated lock nuts 31. The fan blades 27 are formed to project at the proper angle to achieve the greatest possible efficiency for the fan.

Figure 3:
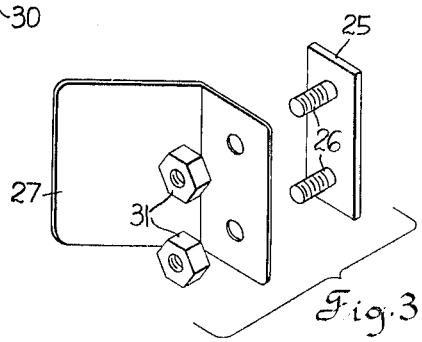
FIG. 3 is an exploded isometric view of the fan blade and its mounting base.

There are many variations of mounting plate configurations which can be used in connection with this invention, and the one illustrated in FIG. 3 of the drawings is merely illustrative of the type that could be used.

In connection with this invention, it can be seen that the rim 14 of the spider 11 extends only to the edge of the dovetail projections 19 for mounting the poles 13 on the spider and does not extend beneath the overhang of the coil portion of the salient poles. This is made possible by the mounting of the fan blades on the coil itself rather than connecting them to the spider. The construction of this invention also eliminates the use of special arms and braces to hold the fans in position.

Although but one embodiment of this invention has been illustrated and described, it will be apparent to those skilled in the art that various changes and modifications can be made therein without departing from the spirit of the invention or the scope of the appended claims.

Having now particularly described and ascertained the nature of our said invention and the manner in which it is to be performed, we declare that what we claim is:

1. A rotor for a dynamoelectric machine comprising: a rotatable member, a plurality of arcuately spaced salient poles mounted on said member, coils on said poles, fan bases positioned on said coil, thermosetting banding tape wound around said coils and over said bases to mount said bases on said poles, and fan blades mounted on said base.

2. A rotor for a dynamoelectric machine comprising: a spider mounted on a shaft and rotatable therewith, a plurality of arcuately spaced salient poles mounted on said spider, coils wound on said poles, fan bases positioned on said coil, thermosetting glass banding tape wound around said coils and over said bases to mount said bases on said poles, and fan blades mounted on said base.

3. The rotor claim 2 in which the base has a pair of outwardly extending studs to which the fan blades are attached.

4. A rotor for a dynamoelectric machine comprising: a spider mounted on a shaft and rotatable therewith, a plurality of arcuately spaced salient poles mounted on said spider, coils wound on said poles, a layer of insulation surrounding said coil, fan bases positioned on said insulation, thermosetting glass banding tape wound around said coils and base to mount said bases on said poles, and fan blades mounted on said base.

5. A salient pole for dynamoelectric machines comprising: a laminated core, a coil wound around said core, a layer of insulation positioned around said coil, a base member attached to said insulation, said base having a pair of studs extending outward therefrom, a thermosetting glass banding tape wound around said base and said core to mount said base on said pole, a fan blade connected to said studs.

References Cited by the Examiner
UNITED STATES PATENTS

| | | | |
|---|---|---|---|
| 1,030,041 | 6/1912 | Williamson | 310—60 |
| 1,908,158 | 5/1933 | Mortensen | 310—60 |
| 2,899,573 | 8/1959 | Wesolowski | 310—60 |
| 3,106,654 | 10/1963 | Wesolowski | 310—61 |

ORIS L. RADER, *Primary Examiner.*

L. L. SMITH, *Assistant Examiner.*